(12) United States Patent
Chen

(10) Patent No.: US 6,485,031 B2
(45) Date of Patent: Nov. 26, 2002

(54) CONNECTING DEVICE FOR A GARDENING TOOL

(76) Inventor: Wen-Chun Chen, No. 16, Lane 26, Fu-Cheng Rd., Fu-Hsing Hsiang, Changhua Hsien (TW)

( * ) Notice: Subject to any disclaimer, the term of this patent is extended or adjusted under 35 U.S.C. 154(b) by 12 days.

(21) Appl. No.: 09/845,443

(22) Filed: Apr. 30, 2001

(65) Prior Publication Data

US 2002/0158425 A1 Oct. 31, 2002

(51) Int. Cl.$^7$ ............................................. B23B 31/107
(52) U.S. Cl. ............................. 279/83; 279/76; 403/378
(58) Field of Search .................... 279/76, 83, 97; 403/378, FOR 103

(56) References Cited

U.S. PATENT DOCUMENTS

| | | | | |
|---|---|---|---|---|
| 1,082,040 A | * | 12/1913 | Nolan | ........................ 172/773 |
| 1,188,779 A | * | 6/1916 | Hodge | ........................ 15/147.2 |
| 1,365,453 A | * | 1/1921 | Burroughs | ................... 279/102 |
| 1,885,089 A | * | 10/1932 | Dukes | .......................... 172/380 |
| 2,606,050 A | * | 8/1952 | Morris et al. | ................ 172/371 |
| 3,024,031 A | * | 3/1962 | Davidson | ...................... 16/429 |
| 5,433,552 A | * | 7/1995 | Thyu | ..................... 297/344.18 |
| 6,145,851 A | * | 11/2000 | Heber | ......................... 279/143 |

FOREIGN PATENT DOCUMENTS

CA 474318 * 6/1951 ................... 279/83

* cited by examiner

*Primary Examiner*—Raleigh W. Chiu
(74) *Attorney, Agent, or Firm*—Hedman & Costigan, P.C.

(57) ABSTRACT

A connecting device for gardening tool has a locking sleeve with a screw bolt and a tool head connector firmly secured in the locking sleeve by inserting the cubic part of the connector into the cubic portion of the locking sleeve and screwing the screw bolt on the locking sleeve. The connecting device allows gardening tool heads to be changed easily and conveniently to satisfy different requirements.

16 Claims, 5 Drawing Sheets

CONNECTING DEVICE FOR A GARDENING TOOL

BACKGROUND OF THE INVENTION

1. Field of the Invention

The present invention relates to a connecting device, and more particularly to a connecting device for a gardening tool so that various tool heads can be attached to a gardening tool depending on different requirements and the tool heads are secured tightly by the connecting device.

2. Description of Related Art

Normally, a tool head on a conventional gardening tool is not intended to be separated from the tool shaft and changed because the head is permanently attached to the shaft to keep it from becoming loose. With reference to FIG. 6, a conventional gardening tool is composed of a wooden shaft (60) with a steel tool head (65) permanently attached to one end. Consequently, when the tool head (65) wears out, the entire gardening tool have to be discarded and replaced. Additionally, for gardening work, several gardening tools with long shafts have to be available for various requirements. The gardening tools occupy a lot of space in a storage room and tend to be a hindrance when users clean the storage room or put them in order. Therefore, there is a need for a connecting device for gardening tools that allows a single shaft to be used with different tool heads such that the tool heads can be easily interchanged and secured firmly on the shaft during use.

To overcome the shortcomings, the present invention intends to provide a connecting device for a gardening tool that allows different tool heads to be interchanged and used to mitigate and obviate the aforementioned problems.

SUMMARY OF THE INVENTION

The main objective of the invention is to provide a connecting device for a gardening tool to interchange tool heads easily and secure the tool head tightly on the shaft during use.

Other objects, advantages and novel features of the invention will become more apparent from the following detailed description when taken in conjunction with the accompanying drawings.

DETAILED DESCRIPTION OF PREFERRED EMBODIMENT

Figure 1:
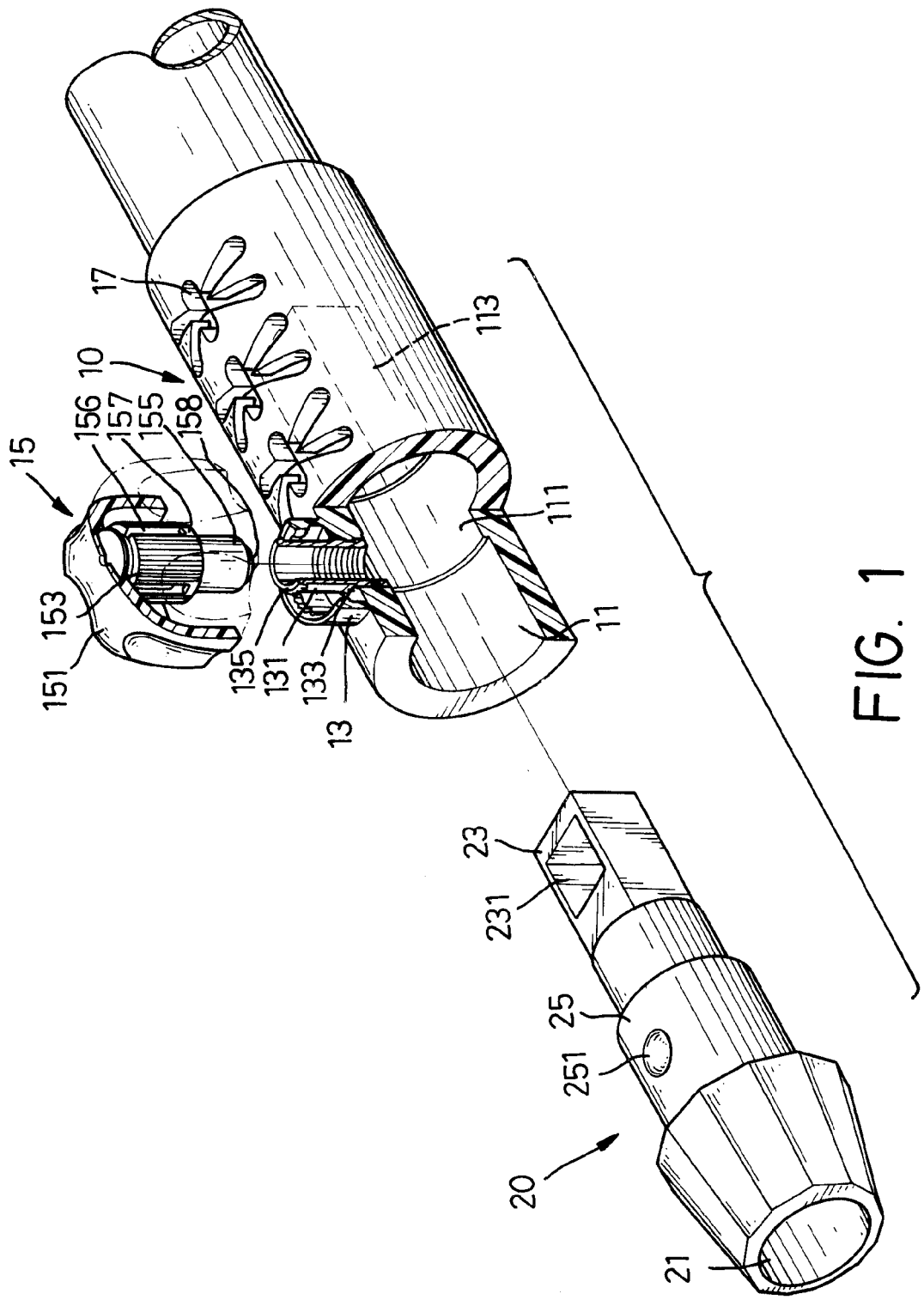
FIG. 1 is a partially exploded perspective view in partial section of a connecting device for a gardening tool in accordance with the present invention.

With reference to FIG. 1, a connecting device in accordance with the present invention has a locking sleeve (10) and a tool head connector (20) respectively adapted to be secured on a shaft and to hold a tool head.

The locking sleeve (10) has a first end, a second end, an inside surface, an outside surface, a port (11), a bolt ring (13) and a hand screw bolt (15). The port (11) is longitudinally defined in the first end of the locking sleeve (10). The bolt ring (13) is formed on the outside surface of the locking sleeve (10). The hand screw bolt (15) is rotatably mounted on the bolt ring (13). The port (11) is divided into a cylindrical portion (111) and a cubic portion (113) to receive the tool head connector (20). The bolt ring (13) has a hollow, cylindrical pin receiver (131) with a top and a bottom mounted in the center of the ring (13). The pin receiver (131) has a threaded hole (133) defined in an inner face of the pin receiver (131). The threaded hole (133) receives the hand screw bolt (15) and communicates with the cylindrical portion (111) of the port (11). The pin receiver (131) has a flange (135) formed on the top, and a ring of teeth is defined on an outer edge of the flange (135). Additionally, multiple openings (17) are defined in the locking sleeve (10) as a decoration and to vent air inside the locking sleeve (10) when the locking sleeve (10) slides onto the shaft of a gardening tool.

Figure 4:
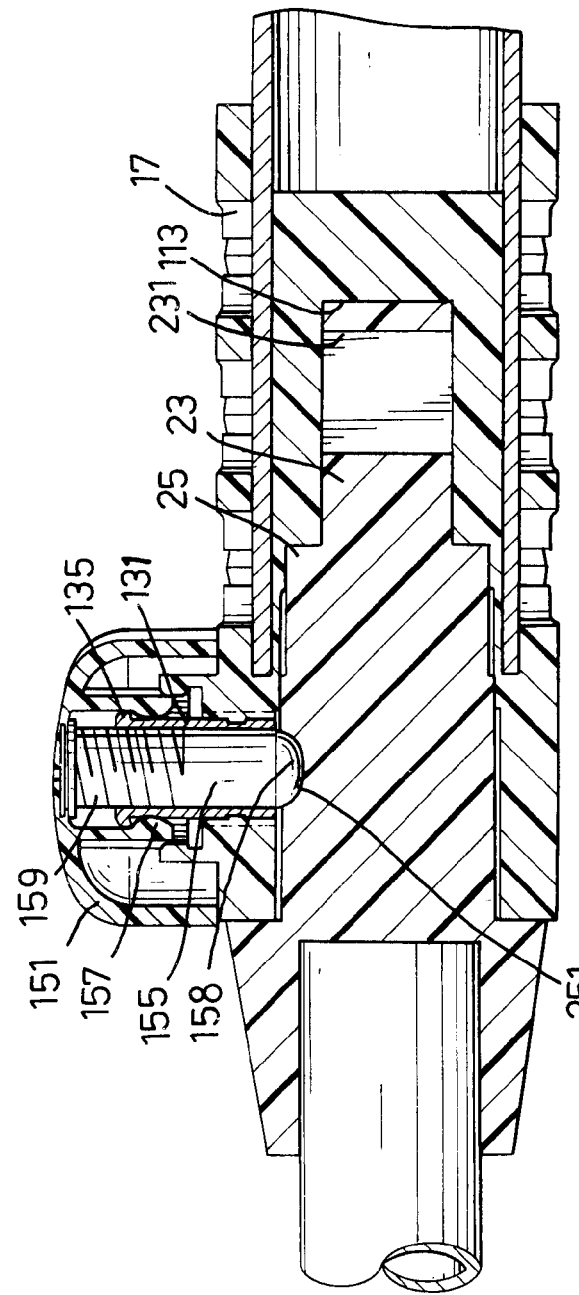
FIG. 4 is a cross-sectional side plan view of the connecting device for a gardening tool along line 4—4 in FIG. 2.

With reference to FIGS. 1 and 4, the hand screw bolt (15) has a knurled cap (151) and a cylindrical chuck (153) with a pin (155) formed downward from the cap (151). The pin (155) is cylindrical and has a proximal end formed with the cap (151), a distal end and an outside surface. A tapered head (158) is formed on the distal end. A thread (159) is formed on the outside surface near the proximal end of the pin (155). At least one gap (156) is defined in the chuck (153) to make the chuck (153) expandable, and an inner diameter of the chuck (153) is slightly larger than an outer diameter of the pin receiver (131). An inward lip (157) is formed on an inner periphery of the chuck (153). The pin (155) has a thread (159) (in FIG. 4) defined on part of a periphery of the pin (155).

The tool head connector (20) has a tapered end, an insertion end, a bore (21), a cubic insert (23) and a locking section (25). The bore (21) is defined in the tapered end of the tool head connector (20) to receive a tool head. The cubic insert (23) is formed at the insertion end of the tool head connector. The locking section (25) is sandwiched between the tapered end and the cubic insert (23). The tapered end has a larger body than the locking section (25) to stop the tool head connector (20) when the tool head connector (20) is connected to the locking sleeve (10). A hole (231) is defined in the insert (23) to allow the tool head connector (20) with the tool head to hang on walls or similar for storage. Two pits (251) are defined on diametrically opposite sides of the locking section (25).

Figure 2:
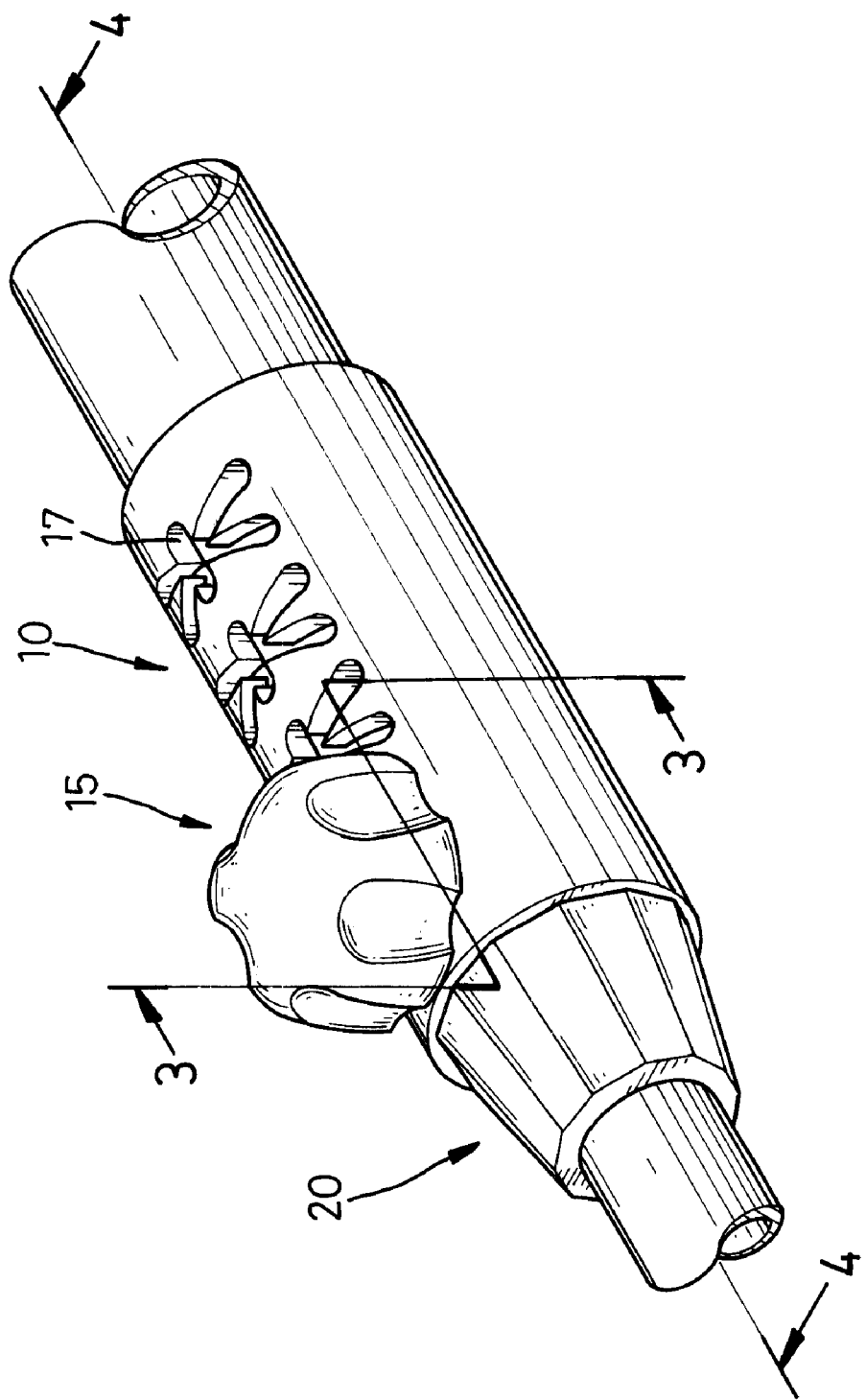
FIG. 2 is a perspective view of the connecting device for a gardening tool in FIG. 1.
Figure 3:
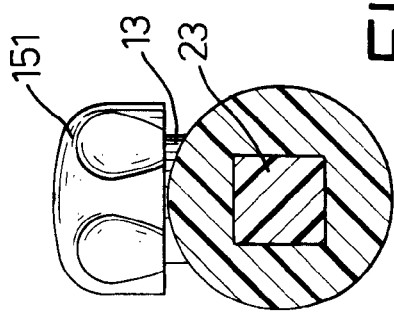
FIG. 3 is a cross-sectional front plan view of the connecting device for a gardening tool along line 3—3 in FIG. 2.

With reference to FIGS. 2, 3 and 4, the insert (23) and the locking section (25) of the tool head connector (20) are inserted into the port (11) of the locking sleeve (10), and the tapered end of the tool head connector (20) is blocked out of the port (11). In FIG. 4, the insert (23) and the locking section (25) are snugly received inside the cylindrical portion (113) and the cubic portion of the port (11) respectively with one pit (251) aligning with the threaded hole (133). The cubic portion (113) makes the tool head connector (20) with tool head stay in one position and not rotate to keep the tool head from separating from the handle during use.

The screw bolt (15) is rotatably mounted and retained on the bolt ring (13) on the locking sleeve (10) by pressing the knurled cap (151) down into the bolt ring (13). The pin (155) penetrates the threaded hole (133), and the lip (157) is retained below the flange (135) in the pin receiver (131). Therefore, when the tool head connector (20) is snugly secured inside the port (11), a user rotates the knurled cap (151) to make the thread (159) on the pin (155) screw into the threaded hole (133) in the pin receiver (131). When the thread (159) is fully screwed in, the tapered head (158) of the pin (155) extends into the pit (251) in the tool head connector (20). With the tapered head (158) firmly in the pit (251), the tool head connector (20) with the tool head is firmly secured to the locking sleeve (10).

When the tool head is to be separated from the handle, a user rotates the knurled cap (151) in a reversal direction to back the pin (155) out of the threaded hole (133) in the pin receiver (131). The hand screw bolt (15) is retained on the bolt ring (13) and does not drop from the locking sleeve (10) because the lip (157) on the chuck (153) holds the flange (135) on the pin receiver (131).

Figure 5:
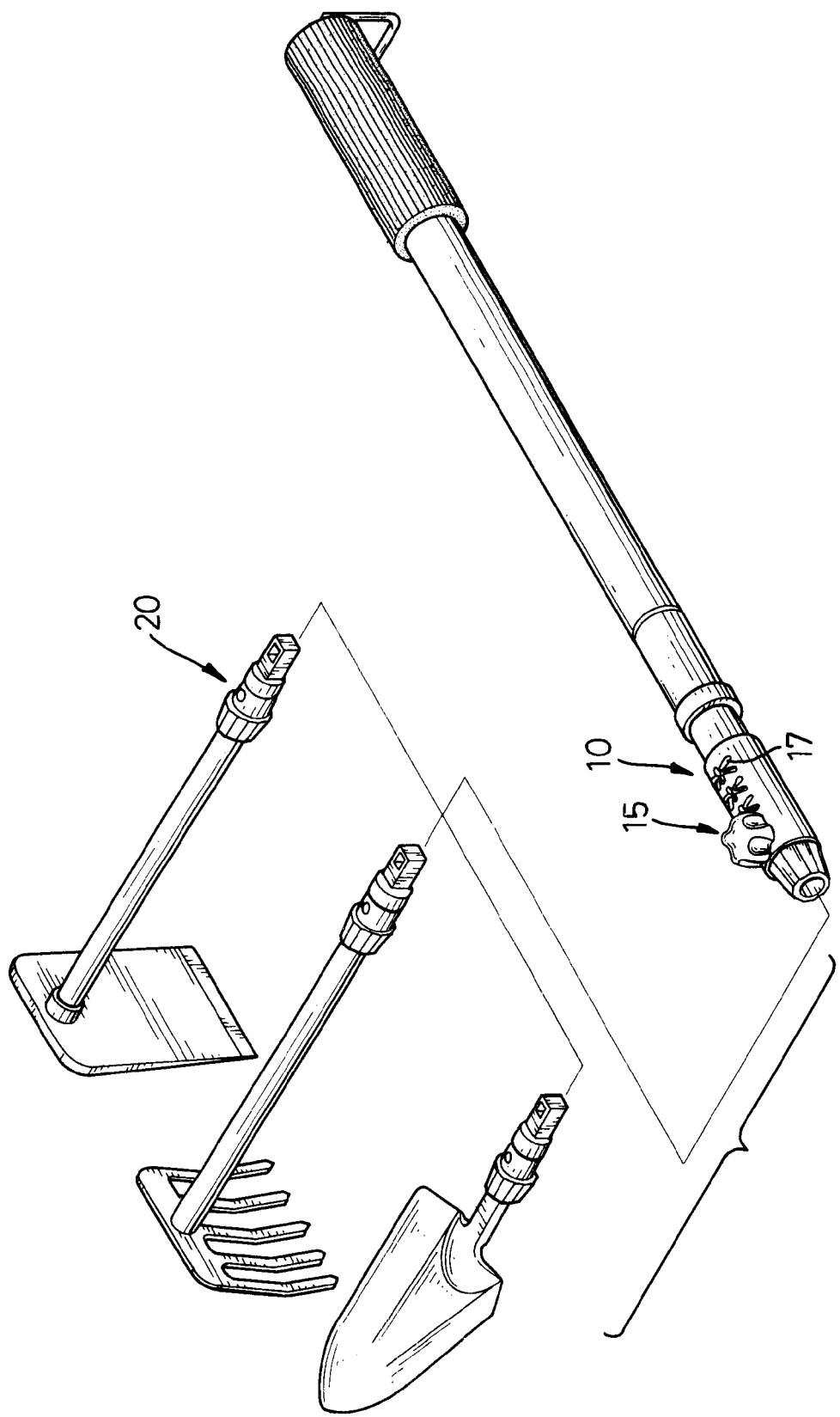
FIG. 5 is an exploded perspective view of the connecting device for a gardening tool in FIG. 1 with different tool heads.
Figure 6:
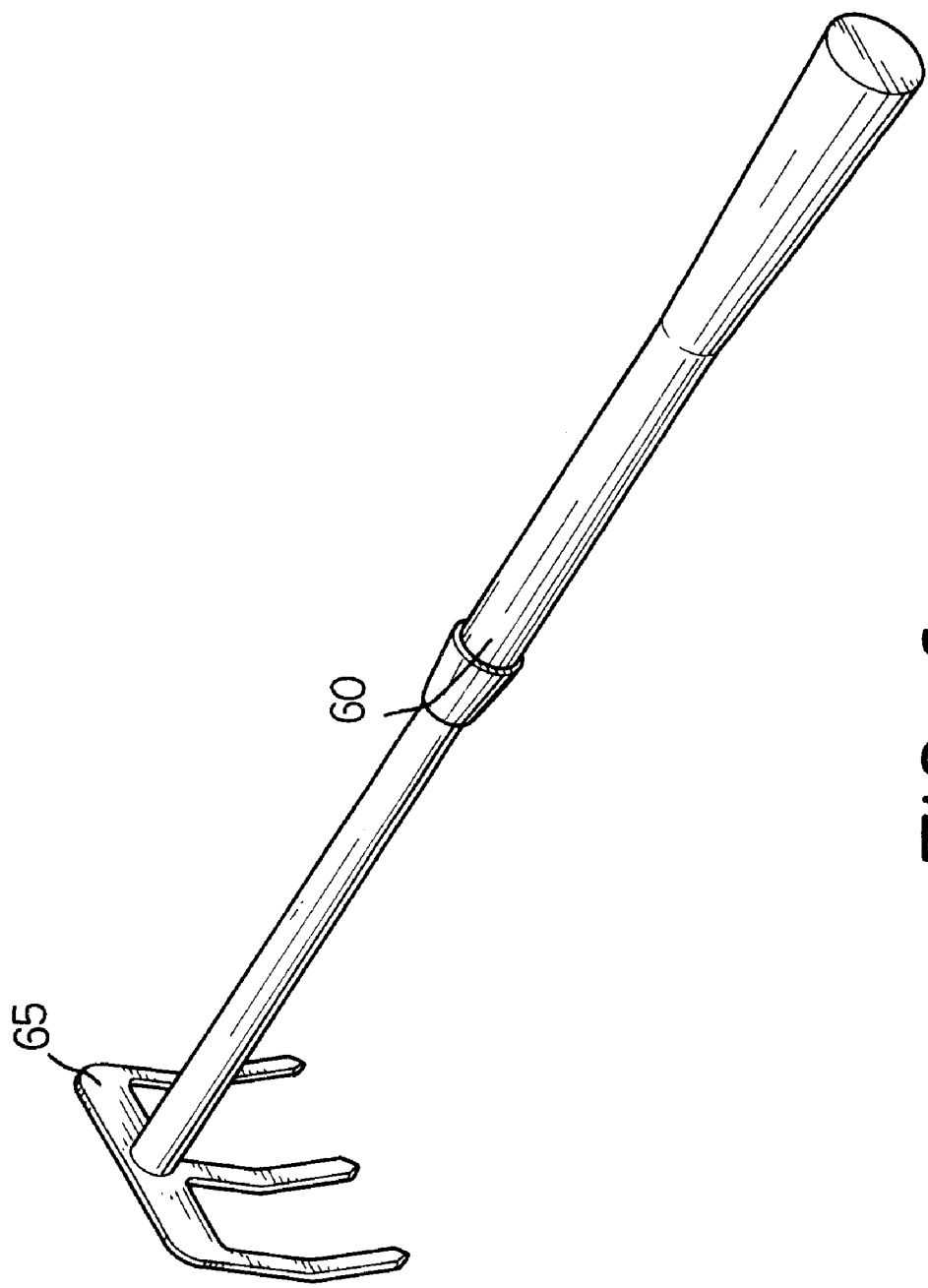
FIG. 6 is a perspective view of a conventional gardening tool.

The connecting device has the following advantages:

1. The tool head including embodiments shown in FIG. 5 is changeable, and manufacturers can produce a series of gardening tool heads in accordance with this invention to make consumers have many choices.

2. Changing the tool head is easy and convenient for users.

3. The insert in the tool head connector keeps the tool head from rotating and separating from the handle during use.

4. The hand screw bolt is retained on the locking sleeve when it is loosened so that users do not need to worry about losing the hand screw bolt.

Characteristics and advantages of the present invention have been set forth in the foregoing description, together with details of the structure and function of the invention. However, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A connecting device for a gardening tool comprising:
a hollow locking sleeve having a port longitudinally defined in one end of the locking sleeve, a bolt ring formed on the locking sleeve and having a pin receiver defined in the bolt ring, and a screw bolt detachably and securely mounted on the bolt ring, wherein the locking sleeve is adapted to be secured to a gardening shaft; and
a tool head connector combined with the locking sleeve and having a bore defined on one end of the tool head connector and adapted to be secured to a gardening tool head, an insert plugged into the port of the locking sleeve, and at least one pit defined in a surface of the insert and to mate with the screw bolt when attaching the tool head connector.

2. The connecting device for a gardening tool head as claimed in claim 1, wherein the pin receiver of the bolt ring has a threaded hole and the pin of the screw bolt has a thread formed to correspond to the threaded hole when attaching the tool head connector.

3. The connecting device for a gardening tool as claimed in claim 2, wherein a flange is outwardly formed on a top of the pin receiver and the screw bolt has a chuck with a lip inwardly formed on the chuck, so as that when the screw bolt is mounted on the bolt ring, the flange and the lip engage with each other to retain the screw bolt on the locking sleeve.

4. The connecting device for a gardening tool as claimed in claim 2, wherein the port of the locking sleeve has a cubic portion and the insert on the tool head connector has a cubic part corresponding to the cubic portion, whereby after the cubic part is received in the cubic portion, a rotation of the tool head is avoided.

5. The connecting device for a gardening tool as claimed in claim 2, wherein the locking sleeve has multiple openings defined in the other end to vent air inside the locking sleeve when connecting the locking sleeve to the shaft of a gardening tool.

6. The connecting device for a gardening tool as claimed in claim 2, wherein a tapered head is formed on a distal end of the pin to extend into the pit of the insert to firmly secured the tool head connector.

7. The connecting device for a gardening tool as claimed in claim 1, wherein a flange is outwardly formed on a top of the pin receiver and the screw bolt has a chuck with a lip inwardly formed on the chuck, so as that when the screw bolt is mounted on the bolt ring, the flange and the lip engage with each other to retain the screw bolt on the locking sleeve.

8. The connecting device for a gardening tool as claimed in claim 7, wherein the port of the locking sleeve has a cubic portion and the insert on the tool head connector has a cubic part corresponding to the cubic portion, whereby after the cubic part is received in the cubic portion, a rotation of the tool head is avoided.

9. The connecting device for a gardening tool as claimed in claim 7, wherein the locking sleeve has multiple openings defined in the other end to vent air inside the locking sleeve when connecting the locking sleeve to the shaft of a gardening tool.

10. The connecting device for a gardening tool as claimed in claim 7, wherein a tapered head is formed on a distal end of the pin to extend into the pit of the insert to firmly secured the tool head connector.

11. The connecting device for a gardening tool as claimed in claim 1, wherein the port of the locking sleeve has a cubic portion and the insert on the tool head connector has a cubic part corresponding to the cubic portion, whereby after the cubic part is received in the cubic portion, a rotation of the tool head is avoided.

12. The connecting device for a gardening tool as claimed in claim 11, wherein the locking sleeve has multiple openings defined in the other end to vent air inside the locking sleeve when connecting the locking sleeve to the shaft of a gardening tool.

13. The connecting device for a gardening tool as claimed in claim 11, wherein a tapered head is formed on a distal end of the pin to extend into the pit of the insert to firmly secured the tool head connector.

14. The connecting device for a gardening tool as claimed in claim 1, wherein the locking sleeve has multiple openings defined in the other end to vent air inside the locking sleeve when connecting the locking sleeve to the shaft of a gardening tool.

15. The connecting device for a gardening tool as claimed in claim 14, wherein a tapered head is formed on a distal end of the pin to extend into the pit of the insert to firmly secured the tool head connector.

16. The connecting device for a gardening tool as claimed in claim 1, wherein a tapered head is formed on a distal end of the pin to extend into the pit of the insert to firmly secured the tool head connector.

* * * * *